Patented Dec. 19, 1944

2,365,653

UNITED STATES PATENT OFFICE 2,365,653

SEPARATION OF SULPHONIC ACIDS

Pharez G. Waldo, Wenonah, and Paul M. Goodloe and Henry G. Berger, Woodbury, N. J., assignors to Socony-Vacuum Oil Company, Incorporated, a corporation of New York No Drawing. Application March 16, 1943,
Serial No. 479,374

8 Claims. (Cl. 260—504)

This invention relates to a process for the separation of sulphonic acids prepared by treating hydrocarbon liquids with sulphonating agents and is particularly concerned with accomplishing such separation without the use of alcohols and the like in processes involving sulphonation of relatively viscous petroleum fractions.

Treatment of mineral oils, as lubricating oil fractions, turbine oils, medicinal white oils, and the like with sulphuric acid results in the formation of a sludge, which, together with the unconsumed acid, is allowed to settle from the oil and is withdrawn. Sulphonic acids formed during the treatment of the oil may be found in both the sludge layer and in the "sour" or acid oil above it. Further treatment of the sludge, as with water, results in the separation therefrom of a class of sulphonic acids generally spoken of as "green" sulphonic acids, which are in general more readily soluble in water than in oil. Recovery of these acids may be made conveniently by the process of Humphreys U. S. Patent No. 1,474,933. The sulphonic acid bodies remaining in the sour oil are generally recovered by treatment of the sour oil, either before or after a neutralization treatment, with an aqueous solution of a water-soluble organic compound which is itself a solvent for the sulphonic bodies. This process results in the recovery of a class of sulphonic acid bodies which are in general more readily soluble in oil than in water, and which, because of their color, are usually spoken of as "mahogany" sulphonic acids.

In the treatment of oils with relatively small amounts of acid, the separation of sludge by gravity is relatively clean. When treating some oils with relatively large amounts of acid, the separation by gravity is not clean, a considerable amount of sludge in the form of fine particles, or "pepper" sludge remaining in the oil. In this latter case, the "sour" oil from which the first settled sludge has been withdrawn, is treated with a small amount of water, which serves to agglomerate the "pepper" and permit of its separation, withdrawal, and disposal with the other sludge. Certain other oils, as for instance oils of 50 seconds Saybolt viscosity at 100, intended for transformer oils, and treated with relatively large amounts of acid, as from 40 to 150 pounds of 98% sulphuric acid per barrel, used in several dumps, ordinarily do not exhibit high holdup of "pepper" sludge, but do have a high acidity in the sour state, and require large amounts of caustic for neutralization.

The "pepper" represents dispersed acid sludge in the oil phase which will contaminate brown acids obtainable from the oil phase, thus decreasing the value of such acids for many uses (for example, high grade wetting agents). The acidity of the oil may be reduced by air blowing to remove sulphur dioxide and concurrent coagulation of "pepper" is accomplished by addition of a very small amount of water before blowing. A convenient method for separation of brown acids from the thus treated oil phase is to add a minor proportion of water, preferably by spraying on the top of the oil being treated. When the mixture is then permitted to settle, a phase known as "acid jelly" separates out containing the brown sulphonic acids.

The more viscous oils are not amenable to complete recovery of sulphonic acids by the acid jelly technique. In treating a petroleum distillate of about 100 seconds Saybolt at 100° with a plurality of dumps of acid (or other sulphonating agent) a good separation of acid jelly is achieved in the first stages of the process, but the later separations are slow and incomplete due to a substantial proportion of the mahogany acids being retained as emulsion in the oil phase. Although this difficulty is associated with viscosity, the viscosity at which it becomes an appreciable factor is not capable of accurate determination, lying somewhere between 50 seconds and 100 seconds Saybolt (at 100°) depending upon the the source and history of the oil fraction. The usual method of overcoming this difficulty is to obtain the best possible separation of acid jelly and subsequently extract sulphonic acids retained in the oil. It has long been known that, for maximum recovery of petroleum sulphonates in such cases, it is necessary to extract the sulphonated material from the oil after each sulphonation treatment rather than defer extraction until after the acid treating is completed. These extractions, according to the prior art, are made by treating with a water soluble solvent for the sulphonic acids, for example, water soluble alcohols. Thereafter the solvent is separated by distillation.

We have now found that a clean separation may be readily obtained with substantially complete extraction of sulphonated bodies by adding a substantial proportion of acid jelly from a previous separation to the oil after a sulphonation treatment normally giving a sulphonation mixture difficult to separate.

According to the preferred process, the selected petroleum distillate is given a multiplicity of treats with acids, oleum or other sulphonating agent and the sulphonic acids formed are separated after each dump of oleum as an acid jelly by treating the sour oil with a small proportion of water (0.5 to 5.0% by volume) and the combined acid jellies separated after previous dumps of oleum. This procedure gives a maximum recovery of valuable sulphonic acids and is a marked departure from former acid-treating technique; however, we have found that as long as the amount of water employed is small, the oil is not "wetted" enough to interfere with subsequent dumps of oleum. At the end of the acid treating, the final combined acid jellies may be finished up as in the processes of the prior art; if desired, the neutralized liquor may be freed of oil by naphtha washing and the sulphonates concentrated by salting out and dried on a drum dryer for marketing as detergent or wetting agent. The oil, of course, may be finished in the normal way by neutralization, washing, filtering, etc.

The use of acid jellies from earlier treats enables one to apply the acid jelly process to oils of higher viscosity than would otherwise be possible. This is generally applicable to oils with Saybolt viscosities at 100° F. up to 150 seconds or more.

A prominent advantage of this invention lies in saving of acid and increased yield of sulphonated bodies. Judging from the nature and amount of yields obtained, it appears that sulphonating agents will attack sulphonated hydrocarbons. If sulphonates are permitted to remain in the oil to an acid dump subsequent to that in which they were formed, there seems to be destruction of valuable sulphonates and consumption of acid thereby. The present invention avoids these undesirable results by permitting substantially complete separation of sulphonated bodies between acid dumps.

A five-gallon batch of Mirando 100 seconds at 100° F. distillate was treated with one dump of 50 lbs./bbl. 98% sulphuric acid and with four dumps of 50 lbs./bbl. each of oleum. After each treat, the sludge was separated, the oil blown to coagulate excess "pepper," which was withdrawn, and water added to separate the sulphonic acids as an acid jelly.

One half of one percent of water was added after the acid treat and the first oleum treat and the acid jellies separated readily. After the last three oleum treats, however, 1½ to 2% of water was necessary to separate the acids as a separate phase and even then the separation of the acid jelly was neither rapid nor complete. It was then discovered that good separation could be obtained by using the acid jellies from early treats to extract the sulphonic acids produced by the later treats. Accordingly, in the last three oleum treats the mixed acid jellies from all previous treats were returned to the sour oil in addition to the 1 to 2% of water, the whole agitated and settled for good separation.

The mixed acid jellies were diluted to about double volume with water and neutralized with 20° Baumé caustic soda, whereupon some more oil was recovered and what iron was present from the agitator separated as a "rag" layer. The remaining oil in the liquor was removed by naphtha washing and the sulphonates were concentrated by salting out from the clean liquor, pan-drying the concentrate and finally powdering in a ball mill.

A yield of 14% of sulphonates of high detergent power was obtained in this manner. The detergency test method employed, using a laboratory filling and scouring machine was essentially as follows: The dry cleaned cloth was impregnated with a 10% emulsion of oil in water, dried and sewn into a tube. It was then scoured by rinsing through the rolls of the machine and through a batch of the detergent solution in the tub of the machine for 45 minutes. The scour was followed by six ten-minute rinses. The average temperature of the scouring and rinsing was 105° F. Fifteen pounds of detergent solution were used in each scour and 40 pounds of water in each rinse. Two per cent of detergent and 1½% of sodium carbonate on the basis of weight of the dry cloth were used in each test. These quantities are equivalent to concentrations of 0.18% detergent and 0.13% sodium carbonate in the scouring solution. The following comparative results were obtained.

| Detergent | Oil content by ether extraction | | Per cent of oil recovered by scouring |
|---|---|---|---|
| | Oiled cloth | Scoured cloth | |
| | Per cent | Per cent | |
| Na₂CO₃ blank | 12.85 | 2.40 | 81.3 |
| Palm soap | 12.10 | 1.64 | 86.5 |
| Product described above | 12.30 | 1.31 | 89.4 |

We claim:

1. In a process of treating with successive quantities of sulphonating agent a viscous petroleum oil characterized by incomplete or slow separation of sulphonated material as acid jelly upon addition of small quantities of water to the treated oil at a treating step subsequent to the initial treatment with sulphonating agent, said process including a series of steps in each of which said oil is treated with sulphonating agent, a small quantity of water is added to the reaction mixture and an acid jelly is separated therefrom; the improvement which comprises adding a substantial quantity of acid jelly from a previous step in the process to the reaction mixture prior to separation of acid jelly in a step subsequent to the first step wherein separation of sulphonated material is slow or incomplete.

2. In a process of treating with successive quantities of sulphuric acid a viscous petroleum oil characterized by incomplete or slow separation of sulphonated material as acid jelly upon addition of small quantities of water to the treated oil at a treating step subsequent to the initial treatment with sulphuric acid, said process including a series of steps in each of which said oil is treated with sulphuric acid, a small quantity of water is added to the reaction mixture and an acid jelly is separated therefrom; the improvement which comprises adding a substantial quantity of acid jelly from a previous step in the process to the reaction mixture prior to separation of acid jelly in a step subsequent to the first step wherein separation of sulphonated material is slow or incomplete.

3. In a process of treating with successive quantities of sulphonating agent a viscous petroleum oil having a viscosity upwards of 50 to 100 seconds Saybolt at 100° F., characterized by incomplete or slow separation of sulphonated material as acid jelly upon addition of small quantities of water to the treated oil at a treating step subsequent to the initial treatment with sulphonating agent, said process including a series of steps in each of which said oil is treated with sulphonating agent, a small quantity of water is added to the reaction mixture and an acid jelly is separated therefrom; the improvement which comprises adding a substantial quantity of acid jelly from a previous step in the process to the reaction mixture prior to separation of acid jelly in a step subsequent to the first step wherein separation of sulphonated material is slow or incomplete.

4. In a process of treating with successive quantities of sulphuric acid a viscous petroleum oil having a viscosity upwards of 50 to 100 seconds Saybolt at 100° F., characterized by incomplete or slow separation of sulphonated material as acid jelly upon addition of small quantities of water to the treated oil at a treating step subsequent to the initial treatment with sulphuric acid, said process including a series of steps in each of which said oil is treated with sulphuric acid, a small quantity of water is added to the reaction mixture and an acid jelly is separated therefrom; the improvement which comprises adding a substantial quantity of acid jelly from a previous step in the process to the reaction mixture prior to separation of acid jelly in a step subsequent to the first step wherein separation of sulphonated material is slow or incomplete.

5. In a process of treating with successive quantities of sulphonating agent a viscous petroleum oil characterized by incomplete or slow separation of sulphonated material as acid jelly upon addition of small quantities of water to the treated oil at a treating step subsequent to the initial treatment with sulphonating agent, said process including a series of steps in each of which said oil is treated with sulphonating agent, a small quantity of water is added to the reaction mixture and an acid jelly is separated therefrom; the improvement which comprises adding the combined acid jellies from all previous steps in the process to the reaction mixture prior to separation of acid jelly in a step subsequent to the first step wherein separation of sulphonated material is slow or incomplete.

6. In a process of treating with successive quantities of sulphuric acid a viscous petroleum oil characterized by incomplete or slow separation of sulphonated material as acid jelly upon addition of small quantities of water to the treated oil at a treating step subsequent to the initial treatment with sulphuric acid, said process including a series of steps in each of which said oil is treated with sulphuric acid, a small quantity of water is added to the reaction mixture and an acid jelly is separated therefrom; the improvement which comprises adding the combined acid jellies from all previous steps in the process to the reaction mixture prior to separation of acid jelly in a step subsequent to the first step wherein separation of sulphonated material is slow or incomplete.

7. In a process of treating with successive quantities of sulphonating agent a viscous petroleum oil having a viscosity upwards of 50 to 100 seconds Saybolt at 100° F., characterized by incomplete or slow separation of sulphonated material as acid jelly upon addition of small quantities of water to the treated oil at a treating step subsequent to the initial treatment with sulphonating agent, said process including a series of steps in each of which said oil is treated with sulphonating agent, a small quantity of water is added to the reaction mixture and an acid jelly is separated therefrom; the improvement which comprises adding the combined acid jellies from all previous steps in the process to the reaction mixture prior to separation of acid jelly in a step subsequent to the first step wherein separation of sulphonated material is slow or incomplete.

8. In a process of treating with successive quantities of sulphuric acid a viscous petroleum oil having a viscosity upwards of 50 to 100 seconds Saybolt at 100° F., characterized by incomplete or slow separation of sulphonated material as acid jelly upon addition of small quantities of water to the treated oil at a treating step subsequent to the initial treatment with sulphuric acid, said process including a series of steps in each of which said oil is treated with sulphuric acid, a small quantity of water is added to the reaction mixture and an acid jelly is separated therefrom; the improvement which comprises adding the combined acid jellies from all previous steps in the process to the reaction mixture prior to separation of acid jelly in a step subsequent to the first step wherein separation of sulphonated material is slow or incomplete.

PHAREZ G. WALDO.
PAUL M. GOODLOE.
HENRY G. BERGER.